Figure 1:
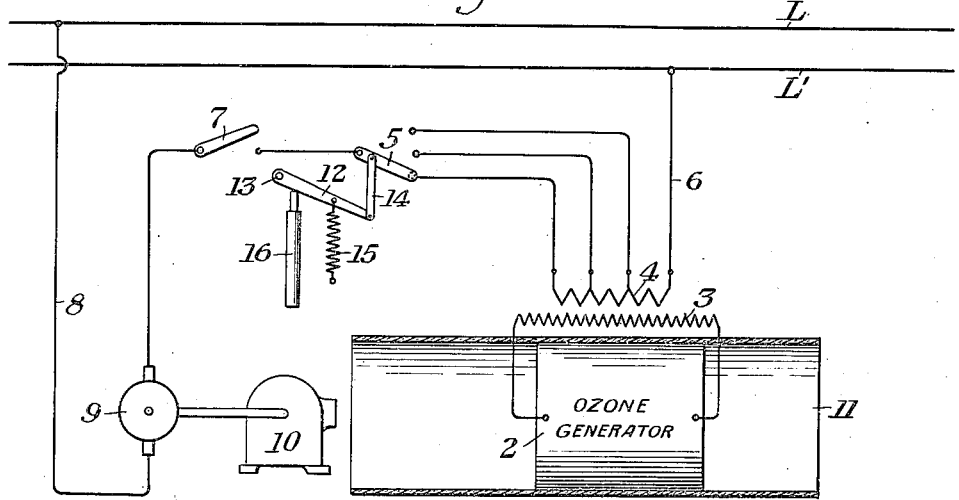

Aug. 19, 1924. 1,505,751

J. TODD

MANUFACTURE OF OZONIZED AIR

Original Filed June 10, 1922

INVENTOR
James Todd,

Patented Aug. 19, 1924.

1,505,751

UNITED STATES PATENT OFFICE.

JAMES TODD, OF SEWICKLEY, PENNSYLVANIA, ASSIGNOR TO ALEXANDER C. TENER, TRUSTEE.

MANUFACTURE OF OZONIZED AIR.

Application filed June 10, 1922, Serial No. 567,484. Renewed February 23, 1923.

*To all whom it may concern:*

Be it known that I, JAMES TODD, a citizen of the United States, residing at Sewickley, in the county of Allegheny and State of Pennsylvania, have invented a new and useful Improvement in the Manufacture of Ozonized Air, of which the following is a full, clear, and exact description.

The present invention relates broadly to the production of so-called ozonized air and more particularly to an apparatus for efficiently producing an ozone constitutent which is substantially constant irrespective of temperature changes in the atmosphere.

I am aware that it has heretofore been proposed to provide ozonizing apparatus with means whereby the operable voltage impressed on the ozone generator might be increased or decreased.

Heretofore, however, there has been no attempt to vary the effective voltage impressed on the ozone generator in accordance with variations in the temperature of the atmosphere to thereby compensate for such changes.

As pointed out in my Patent No. 1,066,065 of July 1st, 1913, the ozone constituent produced by an ozone generator of definite characteristics decreases as the temperature of the atmosphere increases, and increases as the temperature of the atmosphere decreases.

I have also discovered, as set forth in my co-pending application, Serial No. 567,483 filed June 10, 1922, that it is possible to largely compensate for the tendency of an ozone generator to produce an ozone constituent which varies with temperature changes by varying the effective electrode area of the generator as, or in accordance with the variations in the temperature of the atmosphere, i. e., by decreasing the effective electrode area as the temperature of the atmosphere decreases, and increasing the effective electrode area as the temperature of the atmosphere increases.

By the present invention, I effect a compensation for variations in the temperature of the atmosphere by varying the effective voltage while maintaining constant the volume of air, the electrode area and the strength of the di-electric within the ozone generator.

In the accompanying drawings I have shown for purposes of illustration only, certain embodiments of the present invention, it being understood that the drawings do not define the limits of my invention, as changes may be made in the construction and the operation illustrated without departing from the spirit of the invention or scope of my broader claims.

In the drawings,—

Figure 2:
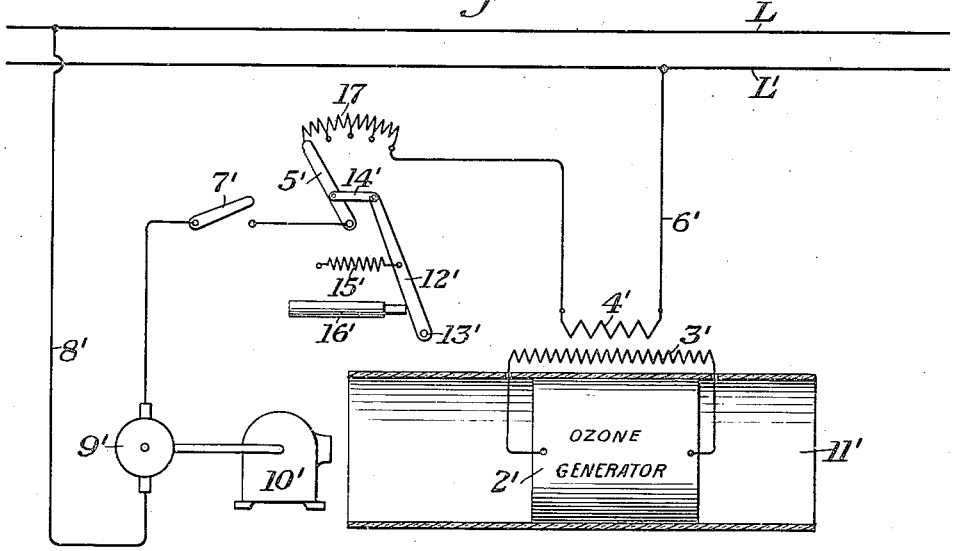

Figure 1 is a diagrammatic illustration of one form of apparatus for carrying out the present invention; and Figure 2 is a similar view of a slightly modified form of apparatus.

Referring more particularly to Figure 1 of the drawings, there is illustrated an ozone generator 2 adapted to receive the desired operating voltage from the secondary 3 of a suitable transformer.

In order to effect variations in the voltages delivered by the transformer, I may provide the primary 4 thereof with a series of sections adapted to be successively cut in or cut out of circuit by a switch 5. One side of the primary 4 of the transformer may receive electric energy through a suitable connection 6 from the line wire L, while the switch 5 may be electrically connected in any desired manner with a main controlling switch 7 receiving current from the line wire L' through the connection 8 and the motor 9.

By reason of this construction, it will be apparent that when the switch 7 is closed current will flow to the motor 9 and with the switch 5 in the position illustrated to all of the sections of the primary 4.

The motor 9 may be operatively connected in any desired manner to a blower or suction device 10 for producing an air flow through the ozone generator 2 which may, if desired, be positioned within a suitable casing 11.

If, for any reason, the temperature of the atmosphere varies, I have found that there will be a corresponding variation in the ozone constituent produced by the ozonizer. In order to overcome such variations, and maintain a substantially constant ozone constituent irrespective of temperature changes, I may operate the switch 5 to cut out sections of the primary 4 of the transformer and thereby increase the voltage output of the secondary as the temperature increases, or may move the switch 5 to successively cut in additional sections in the primary of the transformer as the temperature of the atmosphere decreases.

In this manner I am enabled to secure substantially uniform results.

While the switch 5 may be manually operated if desired, I have found that it may be advantageously operated automatically in accordance with temperature variations in the atmosphere by the use of a thermostatic means of any desired construction.

I have diagrammatically illustrated this means in Figure 1 as comprising a lever 12 having a fixed pivotal mounting 13, and a link connection 14, with the switch 5. The lever 12 may be normally urged in one direction by a spring 15 and may be moved in the opposite direction against the action of the spring by the expansion of the expansible member of the thermostat 16.

In Figure 2 there is illustrated diagrammatically a slightly modified embodiment of the present invention, in which, for purposes of conciseness in the specification I have designated parts corresponding to parts already described in connection with Figure 1 by the same reference characters having a prime affixed thereto. In this form of the invention the primary winding 4' of the transformer may comprise a single section and the desired voltage variations may be produced by the use of a variable resistance 17 in series therewith.

It will be understood that I produce variations in the voltage impressed on the generator while maintaining within the same a fixed dielectric whereby the effective discharge within the generator is caused to vary. The dielectric initially utilized will have a strength sufficiently high to prevent rupturing thereof when operated at the highest variations which may be delivered by the transformer connected thereto.

In my co-pending application Serial No. 659,419 filed August 25, 1923, I have claimed the manufacture of so-called ozonized air by keeping the ozone content substantially constant with a constant rate of air supplied under varying temperature conditions.

The advantages of the present invention will be obvious to those skilled in the art, since it provides an effective and inexpensive method for obtaining an ozonized air of uniform character.

I claim:

1. In the manufacture of so-called ozonized air, the step consisting of varying the effective voltage delivered to an ozonizer according to the temperature of the atmosphere, substantially as described.

2. In the manufacture of so-called ozonized air, the step consisting of decreasing the effective voltage delivered to an ozonizer as the temperature of the atmosphere decreases, substantially as described.

3. In the manufacture of so-called ozonized air, the step consisting in increasing the effective voltage delivered to an ozonizer as the temperature of the atmosphere increases, substantially as described.

4. In the manufacture of so-called ozonized air, the step consisting in varying the effective voltage delivered to the ozonizer in approximate proportion to the temperature of the atmosphere, decreasing the effective voltage as the temperature decreases and increasing the same as the temperature increases, substantially as described.

5. In the manufacture of so-called ozonized air, the step consisting in varying the effective voltage delivered to an ozonizer, and decreasing the effective voltage as the temperature decreases and increasing the effective voltage as the temperature increases, substantially as described.

6. In the manufacture of so-called ozonized air, the step consisting in automatically varying the effective voltage delivered to an ozonizer according to the temperature of the atmosphere, substantially as described.

7. In the manufacture of so-called ozonized air, the step consisting in automatically varying the effective voltage delivered to an ozonizer in approximate proportion to the temperature of the atmosphere, decreasing the effective voltage as the temperature decreases and increasing the same as the of the atmosphere, substantially as described.

In testimony whereof I have hereunto set my hand.

JAMES TODD.